(12) United States Patent
Hasegawa et al.

(10) Patent No.: US 8,537,932 B2
(45) Date of Patent: Sep. 17, 2013

(54) WIRELESS COMMUNICATION DEVICE, EQUALIZER, COMPUTER-READABLE MEDIUM STORING PROGRAM FOR OBTAINING WEIGHT COEFFICIENTS IN THE EQUALIZER, AND PROCESS FOR OBTAINING WEIGHT COEFFICIENTS IN THE EQUALIZER

(75) Inventors: Tsuyoshi Hasegawa, Kawasaki (JP); Masahiko Shimizu, Kawasaki (JP); Akira Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 888 days.

(21) Appl. No.: 12/262,395

(22) Filed: Oct. 31, 2008

(65) Prior Publication Data

US 2009/0213969 A1 Aug. 27, 2009

(30) Foreign Application Priority Data

Feb. 27, 2008 (JP) ................. 2008-046794

(51) Int. Cl.
*H03K 9/00* (2006.01)
*H04L 27/01* (2006.01)

(52) U.S. Cl.
USPC ............ 375/316; 375/324; 375/340; 375/346

(58) Field of Classification Search
USPC ............... 375/229–236, 240.26–240.29, 284, 375/285, 295, 316, 324, 346, 347, 350, 354
See application file for complete search history.

(56) References Cited

U.S. PATENT DOCUMENTS

| 2006/0109891 A1* | 5/2006 | Guo et al. ............. 375/147 |
|---|---|---|
| 2006/0109897 A1 | 5/2006 | Guo et al. |
| 2006/0245477 A1 | 11/2006 | Yoshida |
| 2007/0058081 A1 | 3/2007 | Kim et al. |
| 2007/0110127 A1* | 5/2007 | Mergen et al. ........... 375/141 |
| 2008/0137723 A1* | 6/2008 | Liu ..................... 375/235 |
| 2009/0103413 A1* | 4/2009 | Matsui et al. ......... 369/59.23 |

FOREIGN PATENT DOCUMENTS

| JP | 7-86972 | 3/1995 |
|---|---|---|
| JP | 2001-60897 | 3/2001 |
| JP | 2006-246128 | 9/2006 |
| JP | 2006-311083 | 11/2006 |

OTHER PUBLICATIONS

Jin Tao, Mcoy Jen, Erica Kim, "Matrix Multiplication", http://math.nyu.edu/~neylon/linalgfall04/project1/jme/index.htm, 2004.*

(Continued)

*Primary Examiner* — Sam K Ahn
*Assistant Examiner* — Linda Wong
(74) *Attorney, Agent, or Firm* — Katten Muchin Rosenman LLP

(57) ABSTRACT

In an equalizer arranged in a wireless communication device: information on correlation in one or more first wireless signals is generated; a channel vector is generated on the basis of the one or more first wireless signals; an extended correlation matrix which contains a correlation matrix indicating the information on correlation and is extended so as to become a circulant matrix is generated; an extended channel vector is generated by extending the channel vector so that the extended channel vector contains elements of the channel vector and has rows the number of which is identical to the number of rows of the extended correlation matrix; and weight coefficients are calculated as a solution, in the frequency domain, of an equation expressed by the extended correlation matrix and the extended channel vector, where the solution is obtained by solving the equation.

8 Claims, 6 Drawing Sheets

(56) References Cited

OTHER PUBLICATIONS

Japanese Office Action dated Apr. 24, 2012, from corresponding Japanese Application No. 2008-046794.
Gregory A. Clark, et al. "A Unified Approach to Time- and Frequency-Domain Realization of FIR Adaptive Digital Filters" IEEE Transactions on Acoustics, Speech, and Signal Processing, Oct. 1983, vol. 31, No. 5, pp. 1073-1083.
TECH I "Simulation-based digital signal processing" vol. 9, CQ Publishing Co., Ltd., vol. 9, pp. 46-49, Jul. 1, 2001.
Japanese Office Action dated Oct. 2, 2012, from corresponding Japanese Application No. 2008-046794.
Simon Haykin, "Adaptive filter theory, (3rd ed.)" Prentice Hall Information and System Sciences Series, Prentice Hall, Inc., dated Dec. 27, 1995, with English translation, 998 pages.
Jianzhong Zhang et al: "Efficient linear equalization for high data rate downlink CDMA signaling", conference record of the 37th. Asilomar Conference on Signals, Systems, & Computers. Pacific Groove, CA, Nov. 9-12, 2003; [Asilomar Conference on Signals, Systems and Computers], New York, NY: IEEE, US, vol. 1, Nov. 9, 2003, pp. 141-145, SP010701443, DOI: 10.1109/ACSSC.2003.1291886 ISBN: 978-0-7803-8104-9.
Gilbert Strang: "A proposal for toeplitz matrix calculations", Studies in Applied Mathamatics, vol. 74, No. 2, Apr. 1, 1986, pp. 171-176, XP055071649.
Yuanbin Guo et al: "Efficient MIMO equalization for downlink multi-code CDMA: complexity optimization and comparative study", Global Telecommunications Conference, 2004. Globecom '04. IEEE Dallas, TX, USA Nov. 29-Dec. 3, 2004, Piscataway, NJ USE, IEEE, Piscataway, NJ, USA, vol. 4, Nov. 29, 2004, pp. 2513-2519, XP010757980, DOI: 10.1109/GLOCOM.2004. 1378459 ISBN: 978-0-7803-8794-2.
Extended European Search Report (EESR) issued on Jul. 25, 2013 in the counterpart European Application No. 08168375.7.

\* cited by examiner

COMPARISON OF AMOUNTS OF CALCULATION

| $N$ | $N^3$ | $3(2N\log_2 2N)$ | RATIO |
|---|---|---|---|
| 20 | 8000 | 638 | 1/13 |
| 40 | 64000 | 1517 | 1/42 |

FIG. 5

WIRELESS COMMUNICATION DEVICE, EQUALIZER, COMPUTER-READABLE MEDIUM STORING PROGRAM FOR OBTAINING WEIGHT COEFFICIENTS IN THE EQUALIZER, AND PROCESS FOR OBTAINING WEIGHT COEFFICIENTS IN THE EQUALIZER

CROSS-REFERENCE TO RELATED APPLICATIONS

This application is based upon and claims the benefits of priority from the prior Japanese Patent Application No. 2008-046794, filed on Feb. 27, 2008, the entire contents of which are incorporated herein by reference.

BACKGROUND OF THE INVENTION (1) Field of the Invention

The present invention relates to a wireless communication device, an equalizer, a computer-readable medium storing a program for obtaining weight coefficients in the equalizer, and a process for obtaining weight coefficients in the equalizer. In particular, the present invention relates to a wireless communication device and an equalizer which performs adaptive equalization with superior equalization characteristics and a small amount of calculation, and a computer-readable medium storing a program for obtaining weight coefficients in the equalizer and a process for obtaining weight coefficients in the equalizer so as to realize superior equalization characteristics and reduction in the amount of calculation.

(2) Description of the Related Art

Currently, high-speed, large-capacity mobile communication systems are being actively studied. For example, development of high-speed wireless communication systems using CDMA (Code Division Multiple Access), represented by the systems using HSDPA (High Speed Downlink Packet Access), is proceeding. Since the development of the systems using HSDPA is aimed at achievement of the transmission rate ten times or more higher than the conventional technique, implementation of an equalizer is contemplated.

In the conventional transmission systems, signal processing called equalization is performed by use of an equalizer. The equalization is processing for reducing distortion occurring during propagation through the transmission line, and normally, the equalizer provided on the receiver side can recover the distortion of the frequency characteristic.

For example, each wireless signal transmitted in mobile communications reaches a receiver after propagation through multiple paths. That is, waves of each signal propagate a plurality of paths because of reflection by mountains, buildings, and the like. Since the waves of each signal reach the receiver at different times depending on the propagation path lengths, delay distortion occurs in the waveform of the received signal. In addition, since reflection and scattering are repeated before the reach to the receiver, amplitude distortion also occurs.

When delay distortion or amplitude distortion occurs, intersymbol interference (in which successively transmitted pulses overlap) occurs, so that the pulses cannot be correctly discriminated by the receiver. Therefore, in order to remove the intersymbol interference and compensate for deterioration of the transmission quality, filters called equalizers are used. The equalizers include, for example, adaptive equalizers, which equalize signals according to change in the characteristics of a transmission line caused by movement of a mobile station and the like.

Specifically, the adaptive equalizers are learning filters, each of which refers to a desired signal (which is called a training signal, and is a signal to be transmitted through a certain transmission line and recovered), and adjusts weight coefficients (tap coefficients) in the filter so that the output of the filter approaches the desired signal. In particular, the transversal equalizer (which uses a transversal filter) is a kind of the adaptive equalizer, and can cope with high-speed fading.

However, for the above equalizers, solving of linear equations expressed by a correlation matrix in and/or between propagation channels is required for obtaining synthesized weights called weight coefficients (tap coefficients) on the basis of the MMSE (Minimum Mean Square Error) criterion. (See, for example, Japanese Unexamined Patent Publication No. 2006-311083.)

Generally, the characteristics of the equalizer are improved with increase in the number of the timings of synthesis (i.e., the number of weight coefficients). Nevertheless, the amount of calculation necessary for solving the linear equations increases in proportion to the cube of the number of the timings of synthesis. Therefore, the performance of the equalizer is limited by the trade-off between the maximum number of the timings of synthesis and the amount of calculation.

SUMMARY OF THE INVENTION

The present invention is made in view of the above problems, and the object of the present invention is to provide a wireless communication device, an equalizer, a computer-readable medium storing a program for obtaining weight coefficients in the equalizer, and a process for obtaining weight coefficients in the equalizer, which can realize equalization with superior equalization characteristics and reduced amount of calculation necessary for obtaining weight coefficients.

In order to accomplish the above object, according to the first aspect of the present invention, a wireless communication device for performing equalization of wireless signals according to a characteristic through a transmission line is provided. The wireless communication device has an equalizer, which comprises: a correlation-information generation unit which generates information on correlation in one or more first wireless signals; a channel-vector generation unit which generates a channel vector on the basis of the one or more first wireless signals; an extended-correlation-matrix generation unit which generates an extended correlation matrix, where the extended correlation matrix contains a correlation matrix indicating the information on correlation and is extended so as to become a circulant matrix; a channel-vector extension unit which generates an extended channel vector by extending the channel vector so that the extended channel vector contains elements of the channel vector and has rows the number of which is identical to the number of rows of the extended correlation matrix; a weight-coefficient calculation unit which calculates weight coefficients as a solution of an equation expressed by the extended correlation matrix and the extended channel vector, where the solution is obtained by solving the equation in the frequency domain; and a synthesis unit which generates an equalized signal by using the weight coefficients and one or more second wireless signals received through one or more receiver antennas.

In order to accomplish the aforementioned object, according to the second aspect of the present invention, an equalizer for performing equalization of wireless signals according to a characteristic through a transmission line is provided. The equalizer comprises: a correlation-information generation unit which generates information on correlation in one or more first wireless signals; a channel-vector generation unit which generates a channel vector on the basis of the one or more first wireless signals; an extended-correlation-matrix generation unit which generates an extended correlation matrix, where the extended correlation matrix contains a correlation matrix indicating the information on correlation and is extended so as to become a circulant matrix; a channel-vector extension unit which generates an extended channel vector by extending the channel vector so that the extended channel vector contains elements of the channel vector and has rows the number of which is identical to the number of rows of the extended correlation matrix; a weight-coefficient calculation unit which calculates weight coefficients as a solution of an equation expressed by the extended correlation matrix and the extended channel vector, where the solution is obtained by solving the equation in the frequency domain; and a synthesis unit which generates an equalized signal by using the weight coefficients and one or more second wireless signals received through one or more receiver antennas.

In order to accomplish the aforementioned object, according to the third aspect of the present invention, a computer-readable medium storing a program to be executed by a computer for obtaining weight coefficients in an equalizer which performs equalization of wireless signals according to a characteristic through a transmission line is provided. When the program is executed by the computer, the program realizes in the computer: a correlation-information generation unit which generates information on correlation in one or more first wireless signals; a channel-vector generation unit which generates a channel vector on the basis of the one or more first wireless signals; an extended-correlation-matrix generation unit which generates an extended correlation matrix, where the extended correlation matrix contains a correlation matrix indicating the information on correlation and is extended so as to become a circulant matrix; a channel-vector extension unit which generates an extended channel vector by extending the channel vector so that the extended channel vector contains elements of the channel vector and has rows the number of which is identical to the number of rows of the extended correlation matrix; and a weight-coefficient calculation unit which calculates weight coefficients as a solution of an equation expressed by the extended correlation matrix and the extended channel vector, where the solution is obtained by solving the equation in the frequency domain.

In order to accomplish the aforementioned object, according to the fourth aspect of the present invention, a process to be executed by a computer for obtaining weight coefficients in an equalizer which performs equalization of wireless signals according to a characteristic through a transmission line is provided. The process comprises the steps of: (a) generating, by a correlation-information generation unit, information on correlation in one or more first wireless signals; (b) generating, by a channel-vector generation unit, a channel vector on the basis of the one or more first wireless signals; (c) generating, by an extended-correlation-matrix generation unit, an extended correlation matrix, where the extended correlation matrix contains a correlation matrix indicating the information on correlation and is extended so as to become a circulant matrix; (d) generating, by a channel-vector extension unit, an extended channel vector by extending the channel vector so that the extended channel vector contains elements of the channel vector and has rows the number of which is identical to the number of rows of the extended correlation matrix; and (e) calculating, by a weight-coefficient calculation unit, weight coefficients as a solution of an equation expressed by the extended correlation matrix and the extended channel vector, where the solution is obtained by solving the equation in the frequency domain.

The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

FIG. 5 is a diagram illustrating, for comparison, examples of the amounts of calculation.

DESCRIPTION OF THE PREFERRED EMBODIMENTS

Preferred embodiments of the present invention will be explained below with reference to the accompanying drawings, wherein like reference numbers refer to like elements throughout.

1. 1st Embodiment

The first embodiment of the present invention is explained below.

1.1 Construction of Equalizer

First, the construction of the equalizer according to the first embodiment is briefly explained below.

Figure 1:
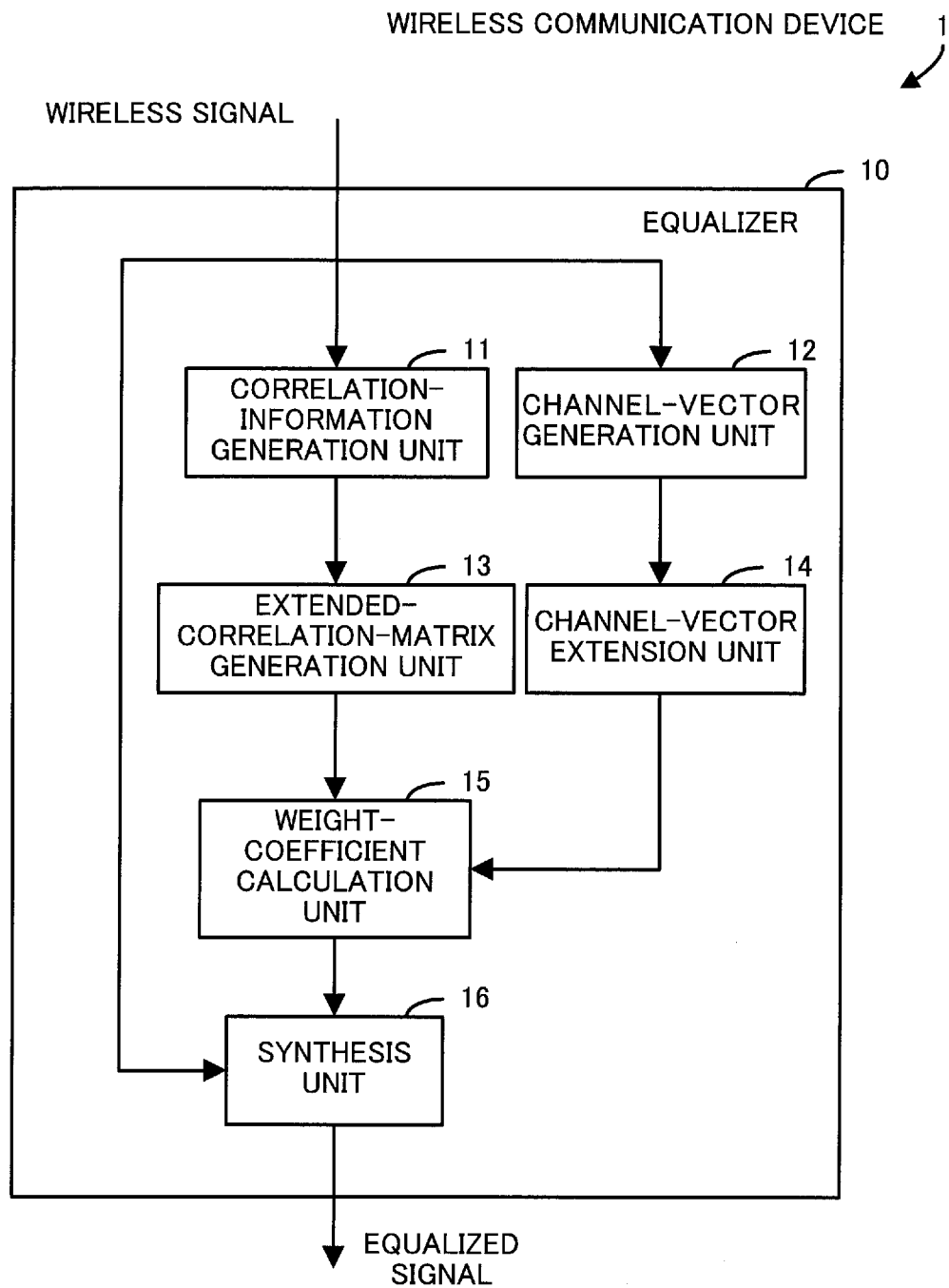
FIG. 1 is a diagram illustrating an outline of a construction of an equalizer in a wireless communication device according to a first embodiment of the present invention.

FIG. 1 shows an outline of a construction of an equalizer in a wireless communication device according to the first embodiment. The wireless communication device 1 illustrated in FIG. 1 contains an equalizer 10, and the equalizer 10 performs equalization, according to the characteristics of a transmission line, of a wireless signal which is received through a receiver antenna after the wireless signal propagates through the transmission line. The equalizer 10 comprises a correlation-information generation unit 11, a channel-vector generation unit 12, an extended-correlation-matrix generation unit 13, a channel-vector extension unit 14, a weight-coefficient calculation unit 15, and a synthesis unit 16.

The correlation-information generation unit 11 generates information on correlation in the wireless signal received through the receiver antenna. Although not shown, the receiver antenna is connected to the wireless communication device 1. The channel-vector generation unit 12 generates a channel vector on the basis of a predetermined wireless signal (e.g., a training signal), which is received through the receiver antenna and is an input signal of the equalizer 10 for obtaining weight coefficients of the equalizer 10.

The extended-correlation-matrix generation unit 13 generates an extended correlation matrix. The extended correlation matrix contains a correlation matrix indicating the information on the correlation (obtained by the correlation-information generation unit 11), and is extended so as to become a circulant matrix.

The channel-vector extension unit 14 generates an extended channel vector by extending the channel vector (generated by the channel-vector generation unit 12) so that the extended channel vector contains the elements of the channel vector and has rows the number of which is identical to the number of rows of the extended correlation matrix.

The weight-coefficient calculation unit 15 calculates the weight coefficients as a solution of an equation expressed by the extended correlation matrix (generated by the extended-correlation-matrix generation unit 13) and the extended channel vector (generated by the channel-vector extension unit 14), where the solution is obtained by solving the equation in the frequency domain and is referred to as an extended solution.

The synthesis unit 16 generates an equalized signal by using a received wireless signal (a wireless signal received by the wireless communication device 1 through the receiver antenna) and the weight coefficients (calculated by the weight-coefficient calculation unit 15).

In the equalizer 10 in the wireless communication device 1 having the above construction, the correlation-information generation unit 11 generates the information on the correlation in the received wireless signal, and the channel-vector generation unit 12 generates the channel vector from the predetermined wireless signal. In addition, the extended-correlation-matrix generation unit 13 generates the extended correlation matrix, and the channel-vector extension unit 14 generates the extended channel vector. The weight-coefficient calculation unit 15 calculates the weight coefficients by solving in the frequency domain an equation expressed by the extended correlation matrix and the extended channel vector. Therefore, it is possible to reduce the amount of calculation necessary for obtaining the weight coefficients in the equalizer 10, and perform equalization with superior equalization characteristics.

1.2 Details of Synthesis Unit

Next, the construction of the synthesis unit 16 in the equalizer 10 is explained in detail below.

Figure 2:
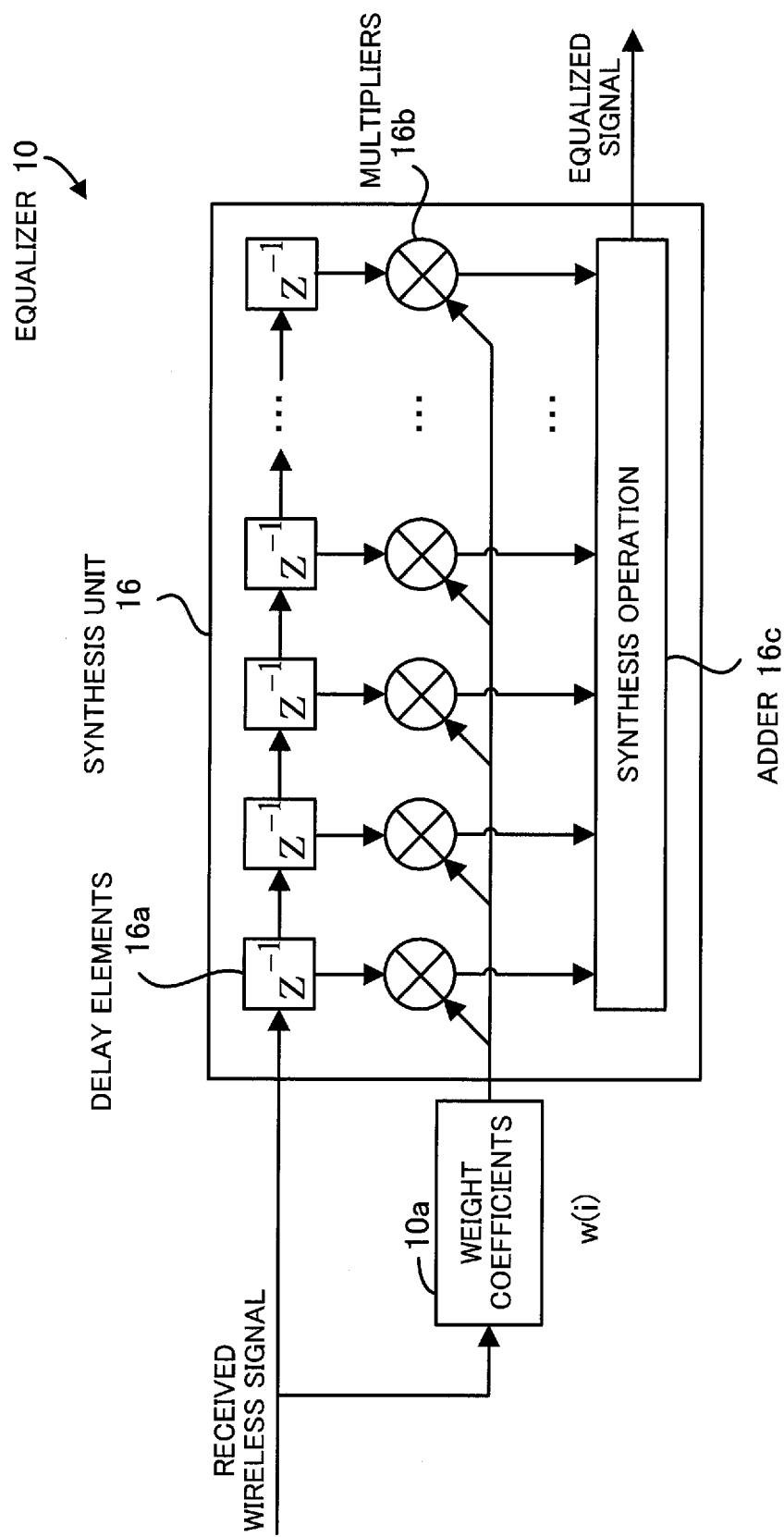
FIG. 2 is a diagram illustrating a concrete construction of a synthesis unit in the equalizer according to the first embodiment.

FIG. 2 shows a concrete construction of the synthesis unit 16 in the equalizer 10 according to the first embodiment of the present invention.

The equalizer 10 according to the first embodiment is a filter which outputs an equalized signal when a received wireless signal is inputted into the equalizer 10, where the equalized signal is generated on the basis of the weight coefficients 10a (w'(i)). Although the equalizer in this embodiment is a transversal filter, the equalizer may be other types of filters.

The synthesis unit 16 in the equalizer 10 comprises delay elements 16a, multipliers 16b, and an adder 16c.

The received wireless signal (i.e., a signal corresponding to a wireless signal received through the receiver antenna and inputted into the wireless communication device 1 illustrated in FIG. 1) is inputted into the synthesis unit 16. In addition, the aforementioned (received) predetermined wireless signal is inputted into the correlation-information generation unit 11, the channel-vector generation unit 12, the extended-correlation-matrix generation unit 13, the channel-vector extension unit 14, and the weight-coefficient calculation unit 15 in the equalizer 10 in the wireless communication device 1 (illustrated in FIG. 1), and the weight coefficients 10a are calculated on the basis of the received predetermined wireless signal.

Each of the delay elements 16a is an element which delays a signal inputted into the element by a predetermined unit time. In the example of FIG. 2, the delay elements 16a (the number of which is N) are serially connected so that each signal is delayed by the predetermined unit time every time the signal passes through one of the delay elements 16a. Thus, the current value of the received wireless signal and the values of the received wireless signal at various earlier times which are outputted from the respective delay elements 16a form an N-dimensional vector as indicated by the expression (1).

$$x = \begin{bmatrix} x(n) \\ x(n-1) \\ x(n-2) \\ \vdots \\ x(n-N+1) \end{bmatrix} \quad (1)$$

Specifically, the element x(n) in the vector (1) is the value of the received wireless signal at the time n, the element x(n−1) in the vector (1) is the value of the received wireless signal at the time n−1 (which is obtained by the delay of the one unit time), and the element x(n−N+1) in the vector (1) is the value of the received wireless signal at the time n−N+1 (which is obtained by the delay of the N−1 unit times).

The weight coefficients (tap coefficients) 10a are coefficients used by the equalizer 10 in calculation for generating an equalized signal from the received wireless signal x, and the number of the weight coefficients 10a is equal to the number of the delay elements 16a. In this example, the weight coefficients 10a are represented by w(0), w(1), ..., w(N−1).

Each of the multipliers 16b calculates the product of the output of the corresponding one of the delay elements 16a and the corresponding one of the weight coefficients 10a, and outputs the product. Specifically, the output x(n) of the first one of the delay elements 16a and the weight coefficient w(0) are inputted into the first one of the multipliers 16b, the output x(n−1) of the second one of the delay elements 16a and the weight coefficient w(1) are inputted into the second one of the multipliers 16b, ..., and the output x(n−N+1) of the Nth one of the delay elements 16a and the weight coefficient w(N−1) are inputted into the Nth one of the multipliers 16b. Thus, each of the multipliers 16b outputs the product of the one of the delay elements 16a and the one of the weight coefficients which are inputted into the multiplier.

The adder 16c generates the equalized signal by performing synthesis calculation of the products outputted from the multipliers 16b. In the synthesis calculation, the adder 16c obtains the sum of all the products outputted from the multipliers 16b.

As explained above, the synthesis unit 16 generates the equalized signal on the basis of the values of the received wireless signal and the weight coefficients 10a (w(i)), and outputs the generated equalized signal.

1.3 Calculation of Weight Coefficients

The calculation of the weight coefficients in the equalizer 10 according to the first embodiment is explained in detail below.

The Wiener-Hopf equations are generally used for obtaining the weight coefficients in a transversal filter, and can be expressed as the following expression (2) in matrix notation.

$$Rw = h \quad (2)$$

In the equation (2), R represents a correlation (autocorrelation) matrix of the aforementioned predetermined wireless signal (which is received through the receiver antenna and inputted into the wireless communication device 1), w represents a weight-coefficient vector the elements of which are the weight coefficients used in generation of the equalized signal by the equalizer 10 (as illustrated in FIG. 2), and h represents the channel vector, which is explained in detail later. The weight coefficients are unknown in the equation (2). For example, when the number of the unknowns in the equation (2) is four, the equation (2) can be expressed as the following equation (3).

$$\overbrace{\begin{pmatrix} a & e & f & g \\ b & a & e & f \\ c & b & a & e \\ d & c & b & a \end{pmatrix}}^{R} \overbrace{\begin{pmatrix} w(0) \\ w(1) \\ w(2) \\ w(3) \end{pmatrix}}^{w} = \overbrace{\begin{pmatrix} h(0) \\ h(1) \\ h(2) \\ h(3) \end{pmatrix}}^{h} \quad (3)$$

Specifically, the correlation matrix R is an M×M matrix, and can be obtained from a received pilot signal (vector) u (which is inputted into the equalizer 10) as expressed in the equation (4).

$$R = E[uu^H] \quad (4)$$

Further, the channel vector h(i) is a cross-correlation vector between the received pilot signal vector u and a desired response d(n), and can be expressed as the following equation (5).

$$h(i) = E[ud^*(n)] \quad (5)$$

The weight coefficients of the transversal filter can be obtained by solving the above equations (2) to (5).

Figure 3:
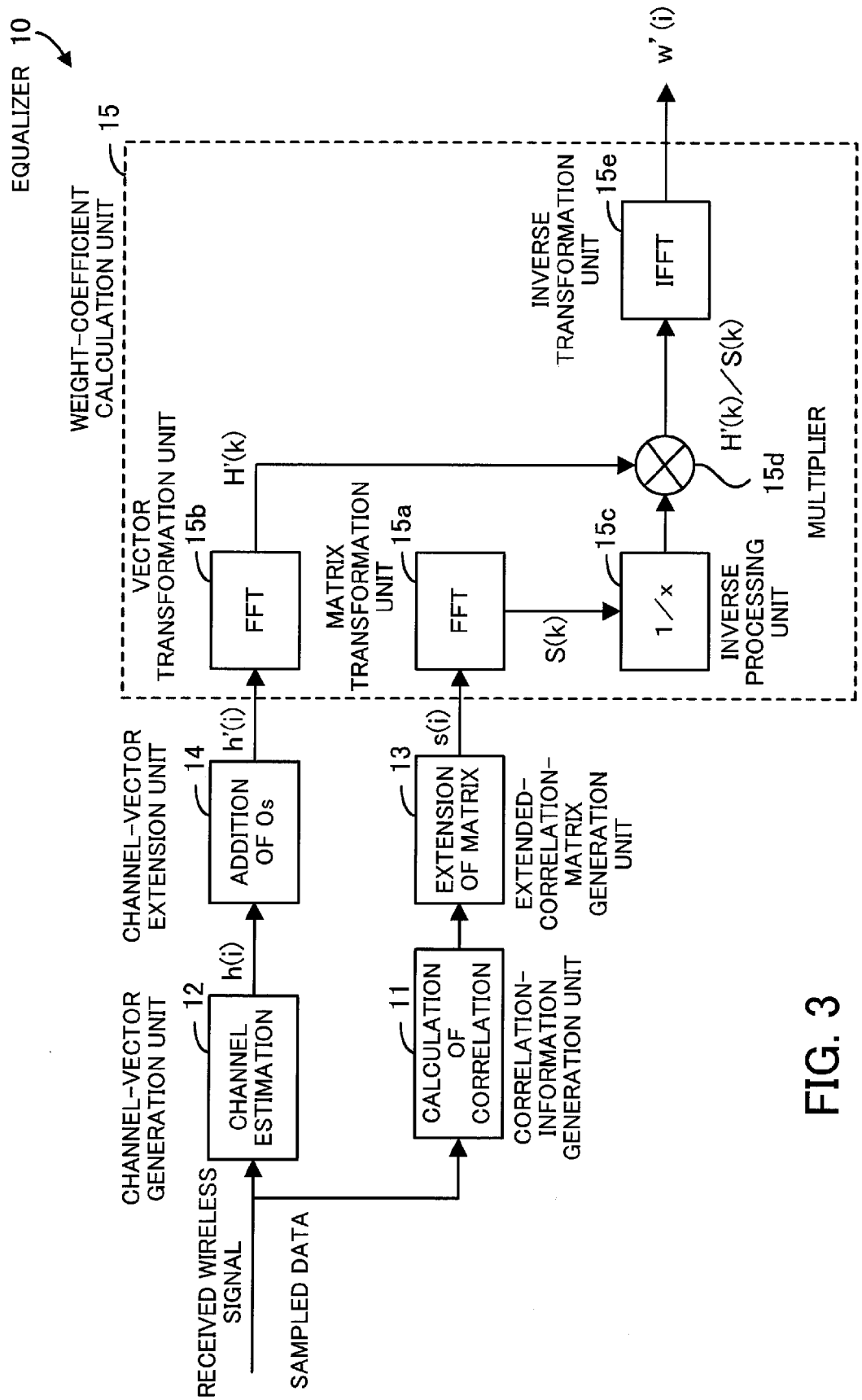
FIG. 3 is a diagram illustrating a construction of the equalizer for calculation of weight coefficients according to the first embodiment.

FIG. 3 shows a construction (functions) of the equalizer 10 for calculation of the weight coefficients in the first embodiment of the present invention. In the equalizer 10 according to the first embodiment (illustrated in FIG. 1), the weight coefficients w(i) are calculated as follows.

The received wireless signal (i.e., the signal corresponding to the wireless signal received through the receiver antenna) is inputted into the wireless communication device 1. The received wireless signal includes: an information signal conveying information; a synchronization signal for signal synchronization; and the received pilot signal u. The received pilot signal u is a pilot signal which corresponds to the desired response d(n) and is received through the receiver antenna. The desired response d(n) is the target signal of the equalized signal to be outputted from the equalizer 10.

The pilot signal is contained in a wireless signal which is transmitted from a transmitter side, and the wireless communication device 1 on the receiver side knows (has sample data of) the response to the pilot signal as the desired response d(n). Since the equalizer 10 knows the response to the pilot signal, when the pilot signal is contained in a wireless signal transmitted from the transmitter, the wireless communication device 1 on the receiver side can use the desired response d(n) (corresponding to the pilot signal) in calculation of the weight coefficients. For example, when the pilot signal is an impulse signal, the impulse response of the system can be used as the desired response d(n).

As explained above, the received pilot signal u (i.e., the pilot signal received through the receiver antenna) is inputted into the equalizer 10 as a part of the received wireless signal. Since the pilot signal is contained in the wireless signal at predetermined timings, the received pilot signal u can be identified on the basis of the synchronization signal.

The channel-vector generation unit 12 generates in the time domain the channel vector h(i) as expressed in the equation (5), on the basis of the received pilot signal u and the desired response d(n) (which the wireless communication device 1 knows).

The correlation-information generation unit 11 generates the correlation matrix on the basis of the received pilot signal u as expressed in the equation (4). The correlation matrix generated by the correlation-information generation unit 11 is extended to an extended correlation matrix R' by the extended-correlation-matrix generation unit 13. In addition, the channel vector h(i) generated by the channel-vector generation unit 12 is extended to an extended channel vector h'(i) by adding one or more 0s so that the extended channel vector h'(i) has the same order (dimensions) as the extended correlation matrix R'. Thus, the equation (3) can be extended to the equation (6) by using the extended correlation matrix R' and the extended channel vector h'(i).

$$\underbrace{\begin{bmatrix} a & e & f & g & 0 & d & c & b \\ b & a & e & f & g & 0 & d & c \\ c & b & a & e & f & g & 0 & d \\ d & c & b & a & e & f & g & 0 \\ 0 & d & c & b & a & e & f & g \\ g & 0 & d & c & b & a & e & f \\ f & g & 0 & d & c & b & a & e \\ 0 & f & g & 0 & d & c & b & a \end{bmatrix}}_{R'} \overbrace{\begin{bmatrix} w(0) \\ w(1) \\ w(2) \\ w(3) \\ w(4) \\ w(5) \\ w(6) \\ w(7) \end{bmatrix}}^{w'(i)} = \overbrace{\begin{bmatrix} h(0) \\ h(1) \\ h(2) \\ h(3) \\ 0 \\ 0 \\ 0 \\ 0 \end{bmatrix}}^{h'(i)} \quad (6)$$

(COEFFICIENTS OF EQUATION — ELEMENTS OF CORRELATION MATRIX R; COEFFICIENTS OF EXTENDED EQUATION)

The extended correlation matrix R' is a circulant matrix produced by extending the correlation matrix R by use of the elements of the correlation matrix R and 0s. In the example of equation (6), the dimensions of the extended correlation matrix R' are twice the dimensions of the correlation matrix R. Hereinbelow, a process for producing the extended correlation matrix R' is explained.

Since the extended correlation matrix R' is a circulant matrix formed with the elements of the correlation matrix R and 0s, the elements of the extended correlation matrix R' in each row are cyclically shifted from the elements in the preceding row to the right by one element. Although the extended correlation matrix R' expressed as the equation (6) having the order of eight (the dimensions of 8×8) is produced by extension of the correlation matrix R expressed by the equation (3) having the order of four (the dimensions of 4×4), the correlation matrix R has only the seven elements "a" to "g." Therefore, the number of elements is insufficient to form the 8×8 circulant matrix. In this example, the shortage is one element. Thus, the circulant matrix is formed by supplementing the shortage by 0s. As explained in details later, the amount of calculation necessary for obtaining the weight coefficients can be reduced when the extended correlation matrix R' is a circulant matrix.

In addition, the weight-coefficient vector w(i) is also extended to the extended weight-coefficient vector w'(i) so as to match the dimension of the extended weight-coefficient vector w'(i) with the dimensions of the extended correlation matrix R' and the extended channel vector h'(i). In this case, unknown numbers (e.g., the unknowns w(4) to w(7) in the equation (6)) are added, instead of the supplementation by 0s.

Thus, the equation (2) is extended to the equation (7).

$$R'w'(i)=h'(i) \quad (7)$$

The weight-coefficient calculation unit 15 calculates the extended weight-coefficient vector w'(i) on the basis of the extended correlation matrix R' and the extended channel vector h'(i). The weight-coefficient calculation unit 15 comprises a matrix transformation unit 15a, a vector transformation unit 15b, an inverse processing unit 15c, a multiplier 15d, and an inverse transformation unit 15e.

As mentioned before, the extended correlation matrix R' is a circulant matrix, in which elements arrayed along a line parallel to the main diagonal are identical. That is, the elements of each row vector constituting the extended correlation matrix R' are cyclically shifted to the right relative to the elements of the preceding row vector. Therefore, the product R'w' of the extended correlation matrix R' and the extended weight-coefficient vector w'(i) is equal to the result of the convolution of one s(i) of the column vectors (the leftmost column vector) constituting the extended correlation matrix R' and the extended weight-coefficient vector w'(i).

Since the calculation of convolution is constituted by simple multiplication in the frequency domain, the amount of calculation necessary for solving the equation (7) can be smaller than the amount of calculation necessary for obtaining the weight coefficients by the conventional technique, for example, as indicated in FIG. 5.

Specifically, only one of the column vectors (e.g., the leftmost column vector) constituting the extended correlation matrix R' is extracted as the extract vector s(i) as indicated by the expression (8).

$$s(i)=(abcd0gfe)^T \quad (8)$$

Then, a transformed extract vector s(i) (the Fourier transform S(k) of the extract vector s(i)) is produced by transforming the extract vector s(i) into frequency domain. In this case, the amount of calculation for fast Fourier transformation can be reduced compared with the case where the entire extended correlation matrix R' is transformed into the frequency domain. However, the entire extended correlation matrix R' or another part of the extended correlation matrix R' may be transformed into the frequency domain.

Since the left side of the equation (7) can be rewritten by the convolution product of the extract vector s(i) and the extended weight-coefficient vector w'(i), the equation (7) can be rewritten as the equation (9), where * indicates convolution.

$$s*w'=h' \quad (9)$$

When the equation (9) is transformed into the frequency domain, the calculation of convolution is realized by multiplication as indicated in the equation (10).

$$S(k)W'(k)=H'(k) \quad (10)$$

When both sides of the equation (10) are divided by S(k), the equation (10) is transformed into the equation (11).

$$W'(k)=H'(k)/S(k) \quad (11)$$

Thus, the Fourier transform W'(k) of the extended weight-coefficient vector w'(i) can be obtained, so that the weight coefficient of the equalizer 10 can be obtained by the equation (11). The weight-coefficient calculation unit 15 performs processing for calculating the weight coefficients on the basis of the above consideration. Details of the processing performed by the weight-coefficient calculation unit 15 for calculating the weight coefficients are explained below.

The matrix transformation unit 15a extracts an extract vector s(i) from the extended correlation matrix R', and performs fast Fourier transformation (FFT) of the extract vector s(i), so that the Fourier transform S(k) of the extract vector s(i) is generated as a transformed extract vector. Since only the extract vector s(i) is necessary for calculation in the frequency domain according to the first embodiment, the extended-correlation-matrix generation unit 13 may generate only the extract vector s(i), instead of generating the entire extended correlation matrix R'.

The vector transformation unit 15b transforms the extended channel vector h'(i) into the frequency domain, so that the Fourier transform H'(k) of the extended channel vector h'(i) is generated as a transformed channel vector. The inverse processing unit 15c obtains the inverse 1/S(k) of the Fourier transform S(k), and the multiplier 15d calculates the product of the Fourier transform H'(k) of the extended channel vector h'(i) (generated by the vector transformation unit 15b) and the inverse 1/S(k) of the Fourier transform S(k), and outputs the product H'(k)/S(k) as the equation (11). The inverse transformation unit 15e transforms the product H'(k)/S(k) (outputted from the multiplier 15d) into the time domain by inverse fast Fourier transformation (IFFT), so that the extended weight-coefficient vector w'(i) is obtained.

In the equalizer 10 according to the first embodiment, only the elements of the extended weight-coefficient vector w'(i) corresponding to the elements of the extended channel vector h'(i) which are the unknowns (not zero) are adopted as the weight coefficients. In the example of the equation (6), the elements w(0) to w(3) are adopted. The remaining elements of the extended weight-coefficient vector w'(i) which are not adopted (e.g., the elements w(4) to w(7) in the example of the equation (6)) are sufficiently small compared with the adopted elements, and can be therefore ignored.

As explained above, the equalizer 10 according to the first embodiment is required to perform fast Fourier transformation three times for calculation of the weight coefficients. However, the amount of calculation for the fast Fourier transformation is on order of n $\log_2$ n (as explained later in detail with reference to FIG. 5). Therefore, the amount of calculation necessary for obtaining the weight coefficients in the equalizer 10 is much smaller than the amount of calculation on order of $n^3$ which is necessary in the direct solving of the linear equations. Nevertheless, since the correlation matrix R is extended, the equation is deformed. Therefore, the solution (the weight coefficients) obtained as above is slightly different from the exact solution. However, in the propagation environment of the typical transmission line, the difference from the exact solution is so small that no practical problem occurs. When more precise weight coefficients are necessary, the precision of the weight coefficients can be increased by iterative calculation such as Gauss-Seidel iteration.

Further, although the order (eight) of the extended correlation matrix R' is twice the order (four) of the correlation matrix R in the example of the equation (6), the values of elements around the center of the array of the elements constituting the extract vector s(i) (e.g., the element "d," the element of "0," and the element "g" in the equation (8)) are very small. Therefore, the amount of calculation necessary for obtaining the weight coefficients can further be reduced by neglecting the elements around the center of the array of the elements constituting the extract vector s(i) when the correlation matrix R is extended or when the extract vector s(i) is generated. In this case, for example, the extract vector s(i) indicated in the expression (8) becomes as the expression (12).

$$s(i)=(abcfe)^T \quad (12)$$

Alternatively, it is possible to increase the dimension of the extract vector s(i) by further adding one or more 0s around the center of the array of the elements constituting the extract vector s(i), for example, as indicated in the expression (13).

$$s(i)=(abcd000000gfe)^T \quad (13)$$

Thus, the equalizer 10 according to the first embodiment obtains the weight coefficients.

1.4 Functions of Wireless Communication Device

The functions of the wireless communication device 1 according to the first embodiment are explained in detail below.

Figure 4:
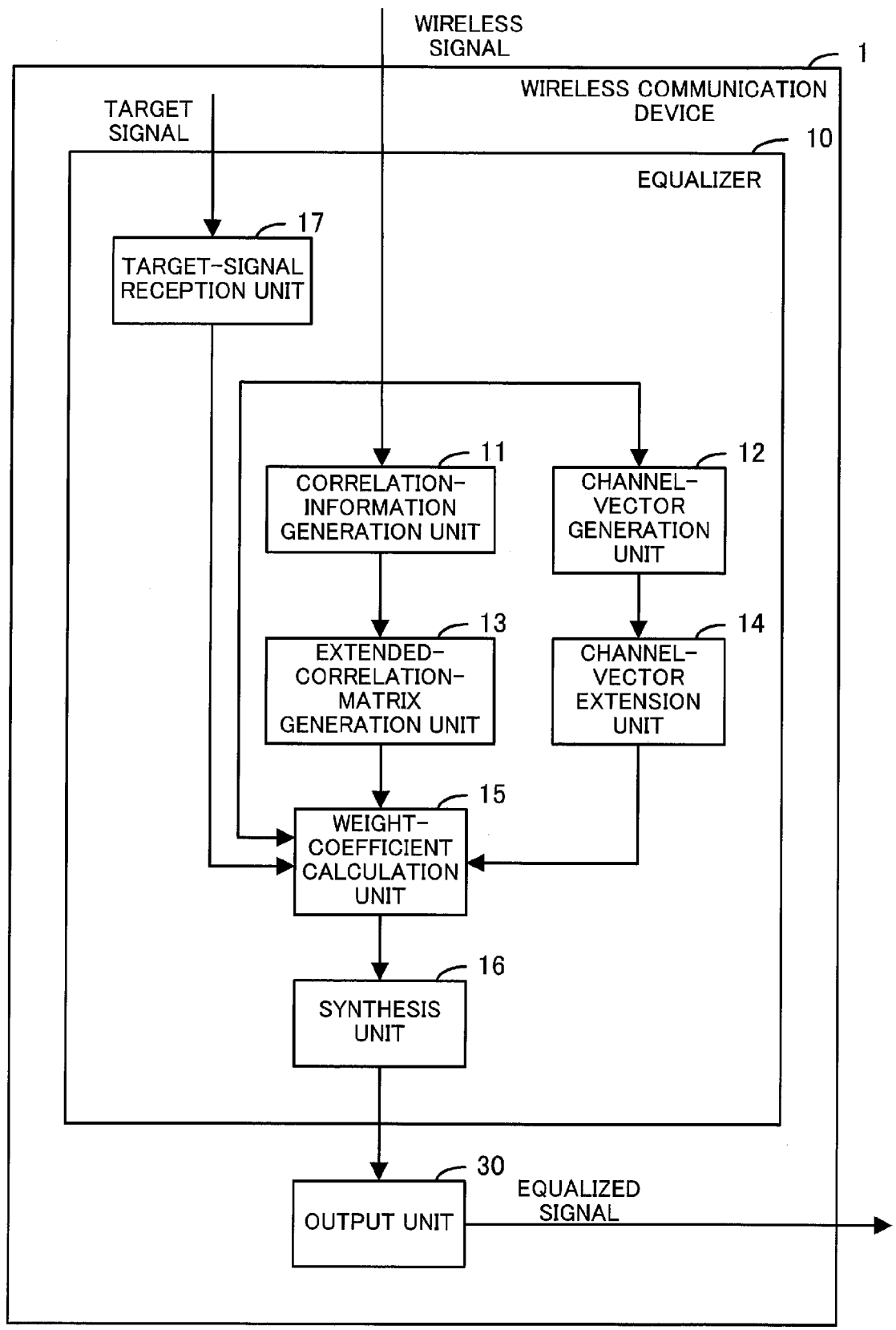
FIG. 4 is a block diagram illustrating the functions of the wireless communication device according to the first embodiment.

FIG. 4 is a block diagram illustrating the functions of the wireless communication device 1. The wireless communication device 1 performs processing for adaptive equalization, according to the characteristics of the transmission line, of the wireless signal which is received through the receiver antenna after propagation through the transmission line. The wireless communication device 1 contains an output unit 30 as well as the equalizer 10, and the equalizer 10 comprises a target-signal reception unit 17 as well as the correlation-information generation unit 11, the channel-vector generation unit 12, the extended-correlation-matrix generation unit 13, the channel-vector extension unit 14, the weight-coefficient calculation unit 15, and the synthesis unit 16.

The correlation-information generation unit 11 generates the information on correlation in the wireless signal received through the receiver antenna (not shown), as indicated in the equation (4). The channel-vector generation unit 12 generates the channel vector on the basis of the aforementioned predetermined wireless signal (e.g., a training signal), which is received through the receiver antenna and inputted into the equalizer 10 for obtaining weight coefficients of the equalizer 10.

The extended-correlation-matrix generation unit 13 generates the extended correlation matrix, where the extended correlation matrix contains the correlation matrix indicating the correlation obtained by the correlation-information generation unit 11 and is extended so as to become a circulant matrix as indicated in the equation (6). Since only the extract vector s(i) is necessary for calculation in the frequency domain according to the first embodiment, the extended-correlation-matrix generation unit 13 may generate only the extract vector s(i), instead of generating the entire extended correlation matrix R'.

The channel-vector extension unit 14 generates the extended channel vector by extending the channel vector generated by the channel-vector generation unit 12 so that the extended channel vector contains the elements of the channel vectors and has rows the number of which is identical to the number of rows of the extended correlation matrix (generated by the extended-correlation-matrix generation unit 13), as indicated in the equation (6).

The weight-coefficient calculation unit 15 calculates the weight coefficients as the solution of the equation expressed by the extended correlation matrix (generated by the extended-correlation-matrix generation unit 13) and the extended channel vector (generated by the channel-vector extension unit 14), where the solution is obtained by solving the equation in the frequency domain and is the aforementioned extended solution.

The weight-coefficient calculation unit 15 uses as initial values the weight coefficients obtained as the extended solution, and corrects the weight coefficients on the basis of a target signal, which is received by the target-signal reception unit 17. The target signal is a signal known to the wireless communication device 1, and the weight-coefficient calculation unit 15 compares the target signal with a predetermined signal contained in the received wireless signal, and reflects an influence of the transmission line on the received wireless signal, in the weight coefficients on the basis of the comparison. The aforementioned desired response d(n) has the function of the target signal, and is used as indicated in the equation (5).

The weight-coefficient calculation unit 15 comprises the matrix transformation unit 15a, the vector transformation unit 15b, a frequency-domain calculation unit (realized by the inverse processing unit 15c and the multiplier 15d), and the inverse transformation unit 15e. (See FIG. 3.)

The matrix transformation unit 15a generates the Fourier transform of the extended correlation matrix (as a transformed matrix) by transforming the extended correlation matrix (produced by the extended-correlation-matrix generation unit 13) into the frequency domain. In the case where the extended-correlation-matrix generation unit 13 directly generates the extract vector s(i) without generating the extended correlation matrix R', the matrix transformation unit 15a generates the Fourier transform S(k) of the extract vector s(i) by transforming the extract vector s(i) into the frequency domain.

The vector transformation unit 15b generates the Fourier transform of the extended channel vector (as the transformed channel vector) by transformation the extended channel vector (generated by the channel-vector extension unit 14) into the frequency domain.

The frequency-domain calculation unit obtains the Fourier transform of the extended weight-coefficient vector w'(i) on the basis of the Fourier transform of the extended channel vector (generated by the vector transformation unit 15b) and the Fourier transform of the extended correlation matrix (generated by the matrix transformation unit 15a), as a solution, in the frequency domain, of an equation constituted by the Fourier transform of the extended channel vector and the Fourier transform of the extended correlation matrix.

The inverse transformation unit 15e generates an extended solution of the extended weight-coefficient vector w'(i) in the time domain by inverse transformation of the Fourier transform of the above solution in the frequency domain (calculated by the frequency-domain calculation unit).

The synthesis unit 16 generates the equalized signal by using the received wireless signal (received through the receiver antenna) and the weight coefficients (calculated by the weight-coefficient calculation unit 15).

The target-signal reception unit 17 receives the target signal for use in the correction of the weight coefficients. The target signal may be held by the wireless communication device 1 in advance, or may be externally supplied to the wireless communication device 1 when the wireless signal is received.

The output unit 30 outputs the equalized signal generated by the synthesis unit 16 in the equalizer 10.

Further, in the case where elements of the extended correlation matrix arrayed along the main diagonal are not all identical, the extended-correlation-matrix generation unit 13 may equalize all the elements of the extended correlation matrix arrayed along the main diagonal with a common value which approximates the values of the elements, as explained in detail later with reference to the expression (14).

Furthermore, the weight-coefficient calculation unit 15 may calculate the weight coefficients as a solution (iterative solution) of iterative calculation in which the extended solution (obtained by the frequency-domain calculation unit and the inverse transformation unit 15e) is used as an initial solution. In this case, it is possible to correct the extended solution so that the calculated values of the weight coefficients approach the true values. Details of the iterative calculation are explained later with reference to the expressions or equations (15) to (30).

As explained above, the wireless communication device 1 according to the first embodiment can reduce the amount of calculation necessary for obtaining the weight coefficients used in the equalizer 10, and perform equalization which is superior in the equalization characteristics.

1.5 Approximation of Extended Correlation Matrix

In the case where the extended correlation matrix is not exactly a circulant matrix, i.e., in the case where elements of the extended correlation matrix arrayed along a line parallel to the main diagonal are not all identical, as indicated in the expression (14), the extended correlation matrix can be modified into a circulant matrix as explained below.

$$R = \begin{pmatrix} a & i & j & k & m & n & p & q \\ b & a' & i' & j' & k' & m' & n' & p' \\ c & b' & a & i & j & k & m & n \\ d & c' & b & a' & i' & j' & k' & m' \\ e & d' & c & b' & a & i & j & k \\ f & e' & d & c' & b & a' & i' & j' \\ g & f' & e & d' & c & b' & a & i \\ h & g' & f & e' & d & c' & b & a' \end{pmatrix} \quad (14)$$

For example, in the case where the received wireless signal is oversampled at a sampling frequency higher than the frequency of the wireless signal as in W-CDMA receivers and the like, generally, the extended correlation matrix generated by the extended-correlation-matrix generation unit 13 is not a circulant matrix, i.e., elements of the extended correlation matrix arrayed along a line parallel to the main diagonal direction are not all identical.

As mentioned before, in the case where elements of the extended correlation matrix arrayed along a line parallel to the main diagonal are not all identical, the extended-correlation-matrix generation unit 13 may equalize all the elements of the extended correlation matrix arrayed along the line parallel to the main diagonal with a common value which approximates the values of the elements, in order to modify the extended correlation matrix into a circulant matrix. After the extended correlation matrix is modified into a circulant matrix, the weight coefficients can be obtained by the aforementioned calculation in the frequency domain.

The extended correlation matrix indicated in the expression (14) is an example obtained by double oversampling (in which the sampling frequency is twice the frequency of the wireless signal). In this extended correlation matrix, two different values (e.g., "a" and "a'" along the main diagonal, or "b" and "b'" along an adjacent line parallel to the main diagonal) are alternately arranged along each of the main diagonal and the lines parallel to the main diagonal. However, for example, the different values "a" and "a'" are near to each other. Therefore, in the equalizer 10 according to the first embodiment, the value "a" may approximate the value "a'," or the value "a'" may approximate the value "a," or the average "(a+a')/2" may approximate both of the value "a" and the value "a'."

1.6 Correction by Iterative Calculation

Hereinbelow, correction, by iterative calculation, of the weight coefficients obtained as the extended solution is explained with reference to the expressions or equations (15) to (30).

In the following explanations, examples of iterative calculation methods which can be executed by the weight-coefficient calculation unit 15 for solving linear equations by iterative calculation are indicated. Normally, the necessary number of iterations in these methods ranges from the number n of elements to several times the number n of elements. However, in the case where the weight-coefficient calculation unit 15 in the equalizer 10 obtains the extended solution as a solution which is accurate to a certain degree, and uses the extended solution as an initial solution, it is possible to greatly reduce the necessary number of iterations in any of the iterative calculation methods.

1.6.1 Conjugate Gradient Method

The equation (2) can be solved by using the conjugate gradient method in the following three steps (a1) to (a3).

$$Rw = h \quad (2)$$

In the equation (2), the correlation matrix R satisfies the relationship $R = R^\dagger$, where $R^\dagger$ is the Hermitian conjugate matrix of the correlation matrix R.

In the step (a1), the initial values are set as indicated in the equation (15), where the vector $w_0$ may be appropriately set. However, in the first embodiment, it is preferable that the aforementioned extended solution obtained by the weight-coefficient calculation unit 15 be set as the vector $w_0$.

$$p_0 = r_0 = h - R w_0 \quad (15)$$

In the step (a2), the calculation in accordance with the equations (16) is performed.

$$\left.\begin{aligned} a_i &= |r_i|^2 / (p_i^\dagger R p_i) \\ w_{i+1} &= w_i + a_i p_i \\ r_{i+1} &= r_i - a_i R p_i \\ b_i &= |r_{i+1}|^2 / |r_i|^2 \\ p_{i+1} &= r_{i+1} + b_i p_i \end{aligned}\right\} \quad (16)$$

In the step (a3), the calculation in the step (a2) is repeated until the solution converges or until a sufficient solution is obtained. The precision of the solution increases with the number of repetition of the calculations.

1.6.2 Gauss-Seidel Iteration Method

The equation (2) can be solved by using the Gauss-Seidel iteration method in the following three steps (b1) to (b3). The correlation matrix R, the weight-coefficient vector w, and the channel vector h are respectively indicated in the expressions (17), (18), and (19).

$$R = \begin{pmatrix} r_{0,0} & r_{0,1} & \cdots & r_{0,N-1} \\ r_{1,0} & r_{1,1} & \cdots & r_{1,N-1} \\ \vdots & \vdots & \ddots & \vdots \\ r_{N-1,0} & r_{N-1,1} & \cdots & r_{N-1,N-1} \end{pmatrix} \quad (17)$$

-continued $$w = \begin{pmatrix} w_0 \\ w_1 \\ \vdots \\ w_{N-1} \end{pmatrix} \qquad (18)$$

$$h = \begin{pmatrix} h_0 \\ h_1 \\ \vdots \\ h_{N-1} \end{pmatrix} \qquad (19)$$

In the step (b1), the initial values are set as indicated in the equation (20), where the vector $w_i^{(0)}$ may be appropriately set. In the first embodiment, it is preferable that the aforementioned extended solution obtained by the weight-coefficient calculation unit 15 be set as the vector $w_i^{(0)}$.

$$w_i^{(0)} = \frac{h_i}{r_{i,i}} \qquad (20)$$

In the step (b2), the calculation in accordance with the equation (21) is performed. In the equation (21), m indicates the number of repetitions of the calculation.

$$w_i^{(m+1)} = \frac{\left(h_i - \sum_{j=0}^{i-1} r_{i,j} w_j^{(m+1)} - \sum_{j=i+1}^{N-1} r_{i,j} w_j^{(m)}\right)}{r_{i,i}} \qquad (21)$$

In the step (b3), the calculation in the step (b2) is repeated until the solution converges or until a sufficient solution is obtained.

1.6.3 Gauss Iteration Method

The equation (2) can be solved by using the Gauss iteration method in the following three steps (c1) to (c3). The Gauss iteration method is different from the Gauss-Seidel iteration method in that $w_j^{(m+1)}$ on the right side of the equation (21) is replaced with $w_j^{(m)}$. The correlation matrix R, the weight-coefficient vector w, and the channel vector h are respectively indicated in the expressions (17), (18), and (19).

In the step (c1), the initial values are set as indicated in the equation (20), where the vector $w_i^{(0)}$ may be appropriately set. In the first embodiment, it is preferable that the aforementioned extended solution obtained by the weight-coefficient calculation unit 15 be set as the vector $w_i^{(0)}$.

$$w_i^{(0)} = \frac{h_i}{r_{i,i}} \qquad (20)$$

In the step (c2), the calculation in accordance with the equations (22) and (23) is performed. In the equations (22) and (23), m indicates the number of repetitions of the calculation.

$$y^{(m)} = c - Rx^{(m)} \qquad (22)$$

$$x_i^{(m)} = \frac{y_i^{(m)}}{a_{i,j}} - x_i^{(m)} \qquad (23)$$

In the step (c3), the calculation in the step (c2) is repeated until the solution converges or until a sufficient solution is obtained.

1.6.4 Least Mean Square (LMS) Method

The weight-coefficient vector w can be obtained by using the least mean square (LMS) algorithm in the following three steps (d1) to (d3), where M indicates the number of taps (i.e., the dimension of the weight-coefficient vector w), and μ is the step-size parameter and is set so as to satisfy 0<μ<2/(Tap-input Power). The tap-input power is expressed as the expression (24).

$$\text{TAP-INPUT POWER} = \sum_{k=0}^{M-1} E[|u(n-k)|^2] \qquad (24)$$

In the step (d1), the initial values of the elements of the weight-coefficient vector w(0) are set. In the first embodiment, it is preferable that the aforementioned extended solution obtained by the weight-coefficient calculation unit 15 be set as the initial values of the elements of the weight-coefficient vector w(0).

In the step (d2), the calculation in accordance with the equations (25) and (26) is performed on the basis of the received pilot signal u(n) and the desired response d(n) at time n.

$$e(n) = d(n) - w^H(n)u(n) \qquad (25)$$

$$w(n+1) = w(n) - \mu w(n)e^*(n) \qquad (26)$$

In the step (d3), until the solution converges or until a sufficient solution is obtained, n is increased as n=0, 1, 2, . . . and the calculation in the step (d2) at time n is performed.

1.6.5 Normalized Least Mean Square (NLMS) Method

The weight-coefficient vector w can be obtained by using the normalized least mean square (NLMS) algorithm in the following three steps (e1) to (e3), where M indicates the number of taps (i.e., the dimension of the weight-coefficient vector w), and μ is the step-size parameter and is set so as to satisfy 0<μ<2.

In the step (e1), the initial values of the elements of the weight-coefficient vector w(0) are set. In the first embodiment, it is preferable that the aforementioned extended solution obtained by the weight-coefficient calculation unit 15 be set as the initial values of the elements of the weight-coefficient vector w(0).

In the step (e2), the calculation in accordance with the equations (25) and (27) is performed on the basis of the received pilot signal u(n) and the desired response d(n) at time n.

$$w(n+1) = w(n) - \frac{\mu}{a + \|u(n)\|^2} w(n)e*(n) \qquad (27)$$

In the step (e3), until the solution converges or until a sufficient solution is obtained, n is increased as n=0, 1, 2, . . . and the calculation in the step (e2) at time n is performed.

1.6.6 Another Iterative Calculation

Another iterative calculation method which is unique to the present embodiment is explained below.

According to this method, the weight-coefficient calculation unit 15 performs the processing in the following steps (f1) to (f4), so that the solution mildly converges. Although the amount of calculation for solving an equation constituted by the product Rw of the correlation matrix R and the weight-coefficient vector w is on order of $n^2$ (where n is the dimension of the weight-coefficient vector w), the amount of calculation for solving the equation by the weight-coefficient calculation unit 15 according to this method is on order of $n \log_2 n$.

In the step (f1), the extended equation (28) indicated below (as an extension of the equation Rw=h) is set so that the extended matrix on the left side of the equation (28) is a circulant matrix. In the steps (f1) to (f4), each of $x_n$ and $y_n$ is a vector having the same dimension as the vector $w_n$, and it is preferable that the aforementioned extended solution obtained by the weight-coefficient calculation unit 15 be set as the initial values of the elements of the weight-coefficient vector $w_0$.

$$\underbrace{\begin{pmatrix} R & A \\ A & R \end{pmatrix}}_{\text{CIRCULANT MATRIX}} \begin{pmatrix} w_0 \\ y_0 \end{pmatrix} = \begin{pmatrix} h \\ x_0 \end{pmatrix} \quad (28)$$

At this time, $x_0$ is set to zero in the equation (28), and the vector $w_0$ is obtained by performing the aforementioned processing by the weight-coefficient calculation unit 15 (which is explained before with reference to the equation (3)). In addition, the vector $y_0$ can also be obtained, where the vector $y_0$ is not zero.

In the step (f2), the vector $x_n$ is obtained by solving the equation (29), where n is the number of repetitions.

$$\begin{bmatrix} h' \\ x_{n+1} \end{bmatrix} = IFFT\left[FFT[s] \times FFT\begin{bmatrix} w_n \\ \alpha y_n \end{bmatrix}\right] \quad (29)$$

In the equation (29), although generally the parameter $\alpha$ is not limited, the parameter $\alpha$ is preferably 0.7 to 0.999.

In the step (f3), the vectors $w_n$ and $y_n$ are obtained by solving the equation (30).

$$\begin{bmatrix} w_{n+1} \\ y_{n+1} \end{bmatrix} = IFFT\left[FFT\begin{bmatrix} h \\ x_{n+1} \end{bmatrix} \div FFT[s]\right] \quad (30)$$

The vector h on the right side of the equation (30) is different from the vector h' on the left side of the equation (29), and is the initial-value vector h on the right side of the equation (28) (which is obtained on the basis of the received pilot signal u).

In the step (f4), until the solution converges or until a sufficient solution is obtained, the calculation in the steps (f2) and (f3) are repeated, where the convergence condition may be $y_n = 0$.

1.7 Reduction in the Amount of Calculation

Finally, the reduction in the amount of calculation necessary for obtaining the weight coefficients of the equalizer 10 in the wireless communication device 1 according to the first embodiment is explained below.

FIG. 5 tabulates examples of the amounts of calculation of the weight coefficients by the direct solving of linear equations on order of $N^3$ and the amounts of calculation of the weight coefficients by the weight-coefficient calculation unit 15 according to the first embodiment on order of $3(2N \log_2 2n)$ in the cases where the number N of taps (the number of the weight coefficients) is 20 and 40.

As indicated in FIG. 5, the amount of calculation necessary for obtaining the weight coefficients according to the first embodiment is approximately 1/13 of the amount of calculation necessary for obtaining the weight coefficients by the conventional (direct) solving of linear equations in the case where the number N of taps is 20, and is approximately 1/42 of the amount of calculation by the conventional (direct) solving of linear equations in the case where the number N of taps is 40.

That is, according to the first embodiment, it is possible to calculate the weight coefficients of an equalizer with a small amount of calculation. Therefore, according to the first embodiment, the adaptive equalizer can be installed even in a portable terminal (such as a mobile phone) in which realization of sufficient calculation capacity is not necessarily easy, so that it is possible to provide a wireless communication device having improved quality in reception of wireless signals.

As explained above, the wireless communication device 1 according to the first embodiment can reduce the amount of calculation and enables reception of wireless signals which are superior in the equalization characteristics and the performance in following up high-speed movement of a mobile terminal, even in the case where mobile or semifixed communication for high-speed data transfer is performed in a multipath environment.

In addition, since the amount of calculation necessary for obtaining the weight coefficients of the equalizer in a mobile terminal is reduced, the power consumption in the mobile terminal is reduced, and the reduction in the power consumption enables downsizing and cost reduction.

2. 2nd Embodiment

Next, the second embodiment of the present invention is explained below. The following explanations on the second embodiment is focused on the differences from the first embodiment, and the same explanations as the first embodiment are not repeated unless necessary.

The equalizer according to the second embodiment is different from the first embodiment in that the equalizer according to the second embodiment performs equalization on the basis of correlations between a plurality of signals which are originated from an identical wireless signal and received through a plurality of receiver antennas.

2.1 Calculation of Weight Coefficients

The calculation of the weight coefficients in the equalizer 20 according to the second embodiment is explained in detail below with reference to the expressions or equations (31) to (40) and FIG. 6.

The equalizer 20 according to the second embodiment is an adaptation of the equalizer 10 according to the first embodiment for the case where a wireless communication device has a plurality of receiver antennas. According to the second embodiment, the weight coefficients of the equalizer 20 are obtained by generating a channel vector and a correlation matrix on the basis of signals received through the plurality of receiver antennas, extending the channel vector and the correlation matrix in a similar manner to the first embodiment, and solving in the frequency domain an equation constituted by the extended correlation matrix and the extended channel vector.

First, consider the extended matrix expression of the Wiener-Hopf equations as follows. As explained for the first embodiment, the Wiener-Hopf equations for obtaining weight coefficients in a transversal filter in a wireless communication device which receives a wireless signal through a single receiver antenna is expressed again as the following extended expression (31) in matrix notation.

$$R'w' = h' \quad (31)$$

In the equation (31), R' represents an extended correlation matrix of a signal which is received through the receiver antenna and inputted into the wireless communication device, w' is the extended weight-coefficient vector, and h' is the extended channel vector. The extended correlation matrix R', the extended weight-coefficient vector w', and the extended channel vector h' are respectively indicated in the expressions (32), (33), and (34).

$$R' = \begin{pmatrix} R & A \\ A & R \end{pmatrix} \quad (32)$$

$$w' = \begin{pmatrix} w \\ y \end{pmatrix} \quad (33)$$

$$h' = \begin{pmatrix} h \\ 0 \end{pmatrix} \quad (34)$$

In the expression (32), R is a partial matrix corresponding to the correlation (autocorrelation) matrix in the first embodiment, and A is a partial matrix added for making the extended correlation matrix R' a circulant matrix. In the expression (33), w corresponds to the weight-coefficient vector (having its elements the weight coefficients for use in generation of the equalized signal as illustrated in FIG. 2) as in the first embodiment, and y is an unknown vector which is added for matching the dimension of the extended weight-coefficient vector w' with the dimensions of the extended correlation matrix R' (containing the partial matrix A). The weight-coefficient vector w is the unknown in the equation (31). In the expression (34), h corresponds to the channel vector as in the first embodiment, and the 0 vector is added for matching the dimension of the extended channel vector h' with the dimensions of the extended correlation matrix R' (containing the partial matrix A).

On the other hand, the equation for obtaining the weight coefficients of an equalizer used in the wireless communication device according to the second embodiment which has a plurality of receiver antennas and performs diversity reception is expressed as the equation (35), where two receiver antennas A and B are connected to the wireless communication device in this example.

$$\begin{pmatrix} R_{11} & R_{21}^\dagger \\ R_{21} & R_{22} \end{pmatrix} \begin{pmatrix} w_1 \\ w_2 \end{pmatrix} = \begin{pmatrix} h_1 \\ h_2 \end{pmatrix} \quad (35)$$

In the expression (35), the partial matrixes $R_{11}$, $R_{21}$, $R_{21}^\dagger$, and $R_{22}$ are each a correlation matrix, the subscripts of each of the partial matrixes indicate the numbers identifying the receiver antennas corresponding to the signals the correlation between which the partial matrix indicates. For example, the correlation matrix $R_{21}$ indicates the correlation between a signal received through a first receiver antenna A (to which the number "1" is assigned) and a second receiver antenna B (to which the number "2" is assigned). $R_{21}^\dagger$ is the Hermitian conjugate matrix of $R_{21}$.

The Hermitian conjugate matrix $R_{21}^\dagger$ is formed with received pilot signals $u_1$ and $u_2$ (which are explained later) as indicated in the expression (36).

$$R_{21}^\dagger = E[u_1 u_1^H] \quad (36)$$

The equation (35) can be extended in a similar manner to the first embodiment as indicated in the equation (37).

$$\left( \begin{array}{cc|cc} R_{11} & A_{11} & R_{21}^\dagger & A_{21}^\dagger \\ A_{11} & R_{11} & A_{21}^\dagger & R_{21}^\dagger \\ \hline R_{21} & A_{21} & R_{22} & A_{22} \\ A_{21} & R_{21} & A_{22} & R_{22} \end{array} \right) \begin{pmatrix} w_1 \\ y_1 \\ w_2 \\ y_2 \end{pmatrix} = \begin{pmatrix} h_1 \\ 0 \\ h_2 \\ 0 \end{pmatrix} \quad (37)$$

In the equation (37), convolution is performed on each of the parts, divided by the dotted lines, of the extended correlation matrix, and each part can be rewritten by using a symbol of an extended correlation matrix. In addition, the vectors on the both sides of the equation (37) can also be rewritten by using the symbols of an extended weight-coefficient vector and an extended channel vector. Thus, the equation (37) can be rewritten as equation (38).

$$\begin{pmatrix} R'_{11} & R'^\dagger_{21} \\ R'_{21} & R'_{22} \end{pmatrix} \begin{pmatrix} w'_1 \\ w'_2 \end{pmatrix} = \begin{pmatrix} h'_1 \\ h'_2 \end{pmatrix} \quad (38)$$

In the equation (38), the product of each extended correlation matrix $R_{ij}'$ and the corresponding extended weight-coefficient vector $w_i'$ (e.g., $R_{11}'$ and $w_1'$) is convolution similar to the first embodiment for the single receiver antenna. Therefore, the equation (38) can be transformed into the frequency domain as indicated in the equation (39).

$$\begin{pmatrix} s_{11}(k) & s_{21}^\dagger(k) \\ s_{21}(k) & s_{22}(k) \end{pmatrix} \begin{pmatrix} W_1'(k) \\ W_2'(k) \end{pmatrix} = \begin{pmatrix} H_1'(k) \\ H_2'(k) \end{pmatrix} \quad (39)$$

The matrix equation (39) represents two linear equations having two unknowns corresponding to the two receiver antennas. Therefore, the equation (39) can be easily solved, for example, by using the inverse matrix as indicated in the equation (40).

$$\begin{pmatrix} W_1'(k) \\ W_2'(k) \end{pmatrix} = \begin{pmatrix} s_{11}(k) & s_{21}^\dagger(k) \\ s_{21}(k) & s_{22}(k) \end{pmatrix}^{-1} \begin{pmatrix} H_1'(k) \\ H_2'(k) \end{pmatrix} \quad (40)$$

The weight coefficients of an equalizer used in the wireless communication device according to the second embodiment having a plurality of (specifically, the two receiver antennas A and B) and performing diversity reception can be obtained as explained above.

2.2 Functions for Calculation

Figure 6:
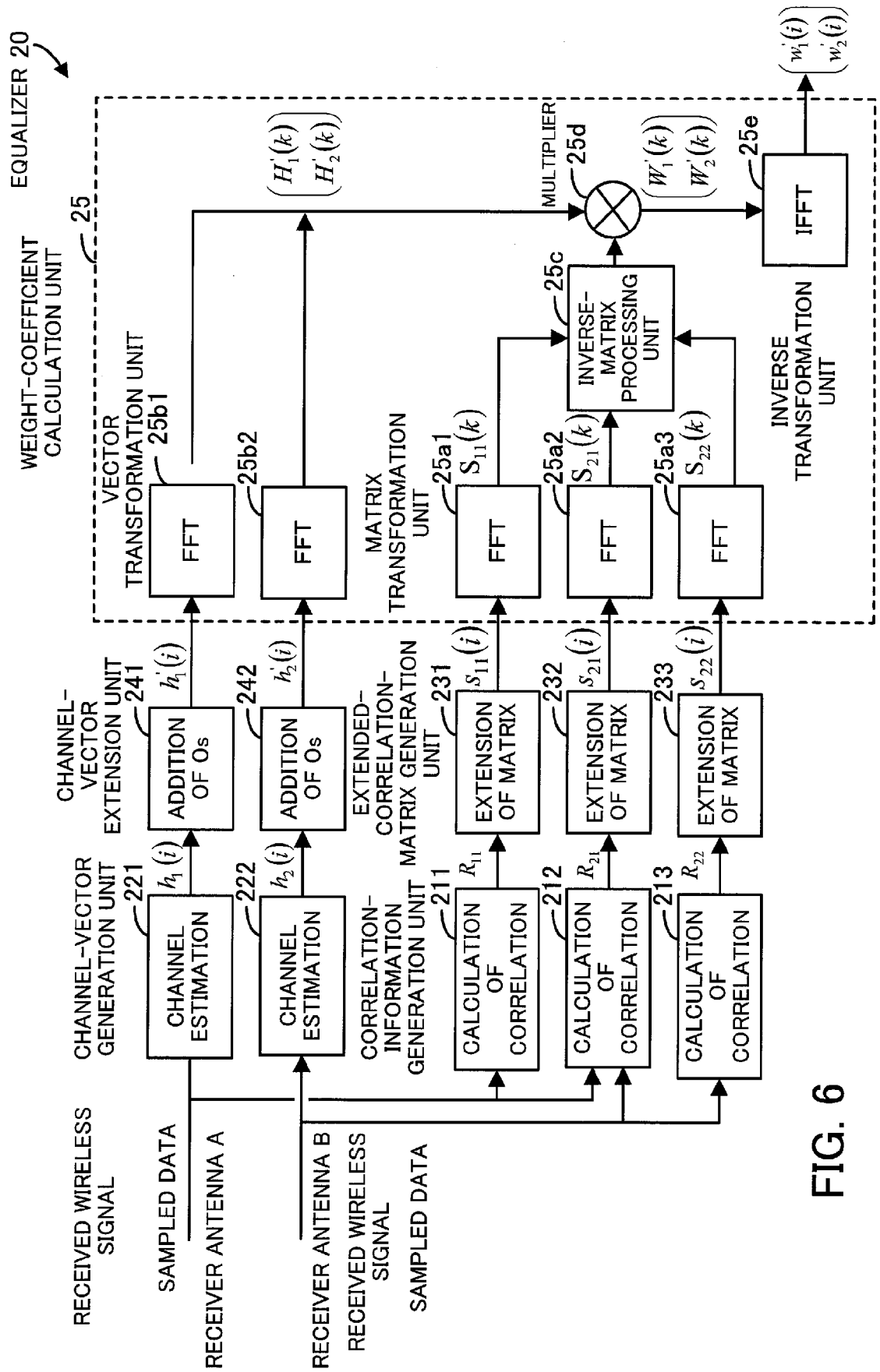
FIG. 6 is a diagram illustrating a construction for calculation of weight coefficients of an equalizer according to a second embodiment of the present invention.

FIG. 6 shows a construction (functions) of the equalizer 20 for calculation of the weight coefficients according to the second embodiment.

The equalizer 20 according to the second embodiment calculates a weight-coefficient vector $w=(w_1(i), w_2(i))^T$ as explained below. As mentioned before, the (extended) correlation matrix according to the second embodiment indicates correlations in and between wireless signals received through the plurality (two in this example) of receiver antennas, and the (extended) channel vector according to the second embodiment is adapted for the plurality (two) of receiver antennas.

In order to obtain the weight-coefficient vector w on the basis of the wireless signals received through the plurality of receiver antennas (the two receiver antennas A and B in this example), the equalizer 20 comprises three correlation-information generation units 211, 212, and 213, three extended-correlation-matrix generation units 231, 232, and 233, two channel-vector generation units 221 and 222, and two channel-vector extension units 241 and 242.

The received wireless signals (i.e., the signals corresponding to the wireless signals received through the receiver antennas) are inputted into the wireless communication device according to the second embodiment. The received wireless signals include: information signals conveying information; synchronization signals for signal synchronization; and the received pilot signals $u_1$ and $u_2$. The received pilot signal $u_1$ is a pilot signal which corresponds to the desired response d(n) and is contained in the wireless signal received through the receiver antenna A, and the received pilot signal $u_2$ is a pilot signal which corresponds to the desired response d(n) and is contained in the wireless signal received through the receiver antenna B. The desired response d(n) is the target signal of the equalized signal to be outputted from the equalizer 20.

As in the first embodiment, the pilot signal is contained in a wireless signal which is transmitted from a transmitter, and the wireless communication device on the receiver side knows (has sample data of) the response to the pilot signal as the desired response d(n). Since the pilot signal is contained in a wireless signal transmitted from the transmitter, and the equalizer 20 knows the response to the pilot signal, the wireless communication device on the receiver side can use the desired response d(n) (corresponding to the pilot signal) in calculation of the weight coefficients. For example, when the pilot signal is an impulse signal, the impulse response of the system can be used as the desired response d(n).

As explained above, the received pilot signals $u_1$ and $u_2$ are inputted as portions of the received wireless signals into the equalizer 20. Since the pilot signals are contained in the wireless signal at predetermined timings, the received pilot signals $u_1$ and $u_2$ can be identified on the basis of the synchronization signal.

The channel-vector generation unit 221 generates in the time domain the channel vector $h_1(i)$ in a similar manner to the first embodiment (as expressed in the equation (5)), on the basis of the received pilot signal $u_1$ and the desired response d(n) (which the wireless communication device knows), and similarly the channel-vector generation unit 222 generates in the time domain the channel vector $h_2(i)$ on the basis of the received pilot signal $u_2$ and the desired response d(n).

The correlation-information generation unit 211 generates a correlation matrix $R_{11}$ on the basis of the received pilot signal $u_1$ in a similar manner to the first embodiment (as expressed in the equation (4)), and similarly the correlation-information generation unit 213 generates a correlation matrix $R_{22}$ on the basis of the received pilot signal $u_2$. In addition, the correlation-information generation unit 212 generates a correlation matrix $R_{21}$ on the basis of the received pilot signals $u_1$ and $u_2$ as expressed in the equation (36).

The correlation matrixes generated by the correlation-information generation units 211, 212, and 213 are extended to correlation matrixes $R_{11}'$, $R_{21}'$, and $R_{22}'$ by the extended-correlation-matrix generation units 231, 232, and 233, respectively. In addition, the channel vectors $h_1(i)$ and $h_2(i)$ generated by the channel-vector generation units 221 and 222 are respectively extended to extended channel vectors $h_1'(i)$ and $h_2'(i)$ by adding one or more 0s to each correlation matrix so that each extended channel vector has the same order (dimensions) as the corresponding correlation matrix. (See the expression (34) and the equations (35) and (37).)

The weight-coefficient calculation unit 25 calculates the extended weight-coefficient vector $w'(i)(=(w_1'(i), w_2'(i))^T)$ on the basis of the extended correlation matrixes $R_{11}'$, $R_{21}'$, and $R_{22}'$ and the extended channel vectors $h_1'(i)$ and $h_2'(i)$. Specifically, the weight-coefficient calculation unit 25 comprises matrix transformation units 25a1, 25a2, and 25a3, vector transformation units 25b1 and 25b2, an inverse-matrix processing unit 25c, a multiplier 25d, and an inverse transformation unit 25e.

As mentioned before, the extended correlation matrixes $R_{11}'$, $R_{21}'$, and $R_{22}'$ are circulant matrixes. Therefore, the product of the matrix on the left side of the equation (37) or (38) (constituted by the extended correlation matrixes $R_{11}'$, $R_{21}'$, $R_{21}'^\dagger$, and $R_{22}'$) and the extended weight-coefficient vector w' is constituted by the convolution of the concatenation of extract vectors $s_{11}(i)$ and $s_{21}^\dagger(i)$ and the extended weight-coefficient vector w' and the concatenation of extract vectors $s_{21}(i)$ and $s_{22}(i)$ and the extended weight-coefficient vector w', where each of the extract vectors $s_{11}(i)$, $s_{21}(i)$, $s_{21}^\dagger(i)$, and $s_{22}(i)$ is one of the column vectors (for example, the leftmost column vector) constituting the corresponding one of the extended correlation matrixes $R_{11}'$, $R_{21}'$, $R_{21}'^\dagger$, and $R_{22}'$. As mentioned before, each of the convolutions becomes simple multiplication in the frequency domain. Therefore, it is possible to solve the equation with a smaller amount of calculation than the direct solving of the equation in the time domain. In the following explanations, the above extract vectors are respectively denoted by $s_{11}(i)$, $s_{21}(i)$, $s_{21}^\dagger(i)$, and $s_{22}(i)$.

The weight-coefficient calculation unit 25 performs the following processing on the basis of the above consideration for calculating the weight coefficients of the equalizer 20.

The matrix transformation units 25a1, 25a2, and 25a3 generate the Fourier transforms $s_{11}(k)$, $s_{21}(k)$, and $s_{22}(k)$ of the extract vectors $s_{11}(i)$, $s_{21}(i)$, and $s_{22}(i)$ by fast Fourier transformation into the frequency domain, and the vector transformation units 25b1 and 25b2 generate the Fourier transforms $H_1'(k)$ and $H_2'(k)$ of the extract vectors $h_1'(i)$ and $h_2'(i)$ by fast Fourier transformation into the frequency domain.

The inverse-matrix processing unit 25c obtains the inverse matrix of the matrix having as elements the Fourier transforms $S_{11}(k)$, $S_{21}(k)$, $S_{21}^\dagger(k)$, and $S_{22}(k)$. The multiplier 25d calculates the product of the inverse matrix and the transformed channel vector $(H_1'(k), H_2'(k))^T$ having as elements the Fourier transforms $H_1'(k)$ and $H_2'(k)$, and outputs the result as $(W_1'(k), W_2'(k))^T$. That is, the Fourier transforms $W_1'(k)$ and $W_2'(k)$ of the parts $w_1'(i)$ and $w_2'(i)$ of the extended weight-coefficient vector w'(i) can be obtained by solving the linear equations having two unknowns as the equation (40). The inverse transformation unit 25e obtains the parts $w_1'(i)$ and $w_2'(i)$ of the extended weight-coefficient vectors w'(i) by transforming the Fourier transforms $W_1'(k)$ and $W_2'(k)$ into the time domain by inverse fast Fourier transformation.

As explained above, in the equalizer 20 according to the second embodiment, only the elements of the extended weight-coefficient vector $w'(i)(=(w_1'(i), w_2'(i))^T)$ corresponding to the elements of the extended channel vector $h_1'(i)$ and $h_2'(i)$ which are the unknowns (not zero) are adopted as the weight coefficients in the equalizer 20 (as in the equalizer 10 according to the first embodiment).

2.3 Advantages of 2nd Embodiment (i) Since the equalizer 20 according to the second embodiment calculates the weight coefficients as above, the equalizer 20 can obtain the weight coefficients with a small amount of calculation while using the plurality of receiver antennas even when reception fading occurs.

(ii) The wireless communication device according to the second embodiment can reduce the amount of calculation and enables reception of wireless signals with superior equalization characteristics and superior performance in following up high-speed movement of a mobile terminal, even in the case where a plurality of receiver antennas are used.

(iii) Since the amount of calculation necessary for obtaining the weight coefficients of the equalizer in a mobile terminal is reduced, the power consumption in the mobile terminal is reduced, and the reduction in the power consumption enables downsizing and cost reduction.

3. Recording Medium Storing Program

The processing functions according to the first and second embodiments which are explained above are realized by computers. In this case, a program describing details of processing for realizing the functions which the wireless communication device should have is provided. When a computer executes the program, the processing functions of the wireless communication device can be realized on the computer.

The program describing the details of the processing can be stored in a recording medium which can be read by the computer. The recording medium may be a magnetic recording device, an optical disk, an optical magnetic recording medium, a semiconductor memory, or the like. The magnetic recording device may be a hard disk drive (HDD), a flexible disk (FD), a magnetic tape (MT), or the like. The optical disk may be a DVD (Digital Versatile Disk), a DVD-RAM (Random Access Memory), a CD-ROM (Compact Disk-Read Only Memory), a CD-R (Recordable)/RW (ReWritable), or the like. The optical magnetic recording medium may be an MO (Magneto-Optical Disk) or the like.

In order to put each program into the market, for example, it is possible to sell a portable recording medium such as a DVD or a CD-ROM in which the program is recorded. Alternatively, it is possible to store the program in a storage device belonging to a server computer, and transfer the program to another computer through a network.

The computer which should execute the program stores the program in a storage device belonging to the computer, where the program is originally recorded in, for example, a portable recording medium, or is initially transferred from the server computer. The computer reads the program from the storage device, and performs processing in accordance with the program. Alternatively, the computer may directly read the program from the portable recording medium for performing processing in accordance with the program. Further alternatively, the computer can sequentially execute processing in accordance with each portion of the program every time the portion of the program is transferred from the server computer.

4. Additional Matters (1) As explained before, the wireless communication device, the equalizer, the program for obtaining weight coefficients in the equalizer stored in the computer-readable storage medium, and the process for obtaining weight coefficients in the equalizer according to the present invention can realize equalization with superior equalization characteristics.

(2) In addition, the equalizers according to the first and second embodiments can also be widely used in various communication devices other than the wireless communication devices.

(3) The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A wireless communication device for performing equalization of wireless signals according to a characteristic through a transmission line, the wireless communication device comprising an equalizer which comprises:
   a correlation-information generation unit which generates a correlation matrix with a dimension of N×N representing autocorrelation of one or more first wireless signals, where N is an integer greater than one;
   a channel-vector generation unit which generates a channel vector with a dimension of N on the basis of the first wireless signals;
   an extended-correlation-matrix generation unit which generates an extended correlation matrix with a dimension of 2N×2N, where the extended correlation matrix is a circulant matrix containing the correlation matrix with a dimension of N×N;
   a channel-vector extension unit which generates an extended channel vector with a dimension of 2N by extending said channel vector;
   a weight-coefficient calculation unit which calculates an extended weight coefficient vector with a dimension of 2N as a solution of an equation expressed by said extended correlation matrix and said extended channel vector, wherein the weight-coefficient calculation unit is configured to solve the equation by repeating a first frequency-domain calculation for the extended channel vector and a second frequency-domain calculation for the extended weight coefficient vector, while the first and second frequency-domain calculations use a part of each other's results so as to increase precision of the extended weight coefficient vector; and
   a synthesis unit which generates an equalized signal by using N elements out of the calculated extended weight coefficient vector and one or more second wireless signals received through one or more receiver antennas.

2. The wireless communication device according to claim 1, wherein:
   said one or more receiver antennas are a plurality of receiver antennas, and said correlation matrix indicates a correlation between wireless signals received through the plurality of receiver antennas; and
   the channel vector indicates a channel vector based on the plurality of receiver antennas.

3. A wireless communication device for performing equalization of wireless signals according to a characteristic through a transmission line, the wireless communication device comprising an equalizer which comprises:
   a correlation-information generation unit which generates information on correlation in one or more first wireless signals;
   a channel-vector generation unit which generates a channel vector on the basis of said one or more first wireless signals;
   an extended-correlation-matrix generation unit which generates an extended correlation matrix, where the extended correlation matrix contains a correlation matrix indicating said information on correlation and is extended so as to become a circulant matrix;
   a channel-vector extension unit which generates an extended channel vector by extending said channel vector so that the extended channel vector contains elements of the channel vector and has rows the number of which is identical to the number of rows of said extended correlation matrix;

a weight-coefficient calculation unit which calculates weight coefficients as a solution of an equation expressed by said extended correlation matrix and said extended channel vector, where the solution is obtained by solving the equation in a frequency domain; and a synthesis unit which generates an equalized signal by using said weight coefficients and one or more second wireless signals received through one or more receiver antennas, wherein in a case where elements of said extended correlation matrix arrayed along a line parallel to a main diagonal of the extended correlation matrix are not all identical, the extended-correlation-matrix generation unit equalizes all the elements of the extended correlation matrix arrayed along the line with a common value which approximates values of the elements of the extended correlation matrix arrayed along the line.

4. The wireless communication device according to claim 1, wherein said weight-coefficient calculation unit comprises:

a matrix transformation unit which generates a transformed matrix by transforming said extended correlation matrix into the frequency domain, a vector transformation unit which generates a transformed channel vector by transforming said extended channel vector into the frequency domain, a frequency-domain calculation unit which obtains a solution corresponding to said extended weight coefficient vector in the frequency domain on the basis of said transformed matrix and said transformed channel vector, and an inverse transformation unit which generates said solution of said equation by transforming into a time domain said solution corresponding to the extended weight coefficient vector.

5. The wireless communication device according to claim 1, further comprising an output unit which outputs said equalized signal generated by said synthesis unit in the equalizer.

6. An equalizer for performing equalization of wireless signals according to a characteristic through a transmission line, comprising:

a correlation-information generation unit which generates a correlation matrix with a dimension of N×N representing autocorrelation of one or more first wireless signals, where N is an integer greater than one;

a channel-vector generation unit which generates a channel vector with a dimension of N on the basis of the first wireless signals;

an extended-correlation-matrix generation unit which generates an extended correlation matrix with a dimension of 2N×2N, where the extended correlation matrix is a circulant matrix containing the correlation matrix with a dimension of N×N;

a channel-vector extension unit which generates an extended channel vector with a dimension of 2N by extending said channel vector;

a weight-coefficient calculation unit which calculates an extended weight coefficient vector with a dimension of 2N as a solution of an equation expressed by said extended correlation matrix and said extended channel vector, wherein the weight-coefficient calculation unit is configured to solve the equation by repeating a first frequency-domain calculation for the extended channel vector and a second frequency-domain calculation for the extended weight coefficient vector, while the first and second frequency-domain calculations use a part of each other's results so as to increase precision of the extended weight coefficient vectors; and a synthesis unit which generates an equalized signal by using N elements out of the calculated extended weight coefficient vector and one or more second wireless signals received through one or more receiver antennas.

7. A non-transitory computer-readable medium storing a program for obtaining weight coefficients in an equalizer which performs equalization of wireless signals according to a characteristic through a transmission line, said program causing a computer to perform a procedure comprising:

generating information on correlation in one or more first wireless signals; generating a channel vector on the basis of said one or more first wireless signals;

generating an extended correlation matrix, where the extended correlation matrix contains a correlation matrix indicating said information on correlation and is extended so as to become a circulant matrix;

generating an extended channel vector by extending said channel vector so that the extended channel vector contains elements of the channel vector and has rows the number of which is identical to the number of rows of said extended correlation matrix;

receiving a target signal representing a desired response to a pilot signal; and calculating weight coefficients as a solution of an equation expressed by said extended correlation matrix and said extended channel vector, wherein the solution is obtained by solving the equation in a frequency domain, and wherein said solution of said equation is used as an initial solution for the weight coefficients, and precision of the weight coefficients corrected is increased on the basis of the desired response to the pilot signal.

8. A process to be executed by a computer for obtaining weight coefficients in an equalizer which performs equalization of wireless signals according to a characteristic through a transmission line, the process comprising:

generating a correlation matrix with a dimension of N×N representing autocorrelation of one or more first wireless signals, where N is an integer greater than one;

generating a channel vector with a dimension of N on the basis of the first wireless signals;

generating an extended correlation matrix with a dimension of 2N×2N, where the extended correlation matrix is a circulant matrix containing the correlation matrix with a dimension of N×N;

generating an extended channel vector with a dimension of 2N by extending said channel vector; and calculating an extended weight coefficient vector with a dimension of 2N as a solution of an equation expressed by said extended correlation matrix and said extended channel vector, wherein the solution of the equation is obtained by repeating a first frequency-domain calculation for the extended channel vector and a second frequency-domain calculation for the extended weight coefficient vector, while the first and second frequency-domain calculations use a part of each other's results so as to increase precision of the extended weight coefficient vector.

* * * * *